July 27, 1965
H. R. BLACK
3,197,030
FILTER APPARATUS
Filed Dec. 27, 1962
3 Sheets-Sheet 1
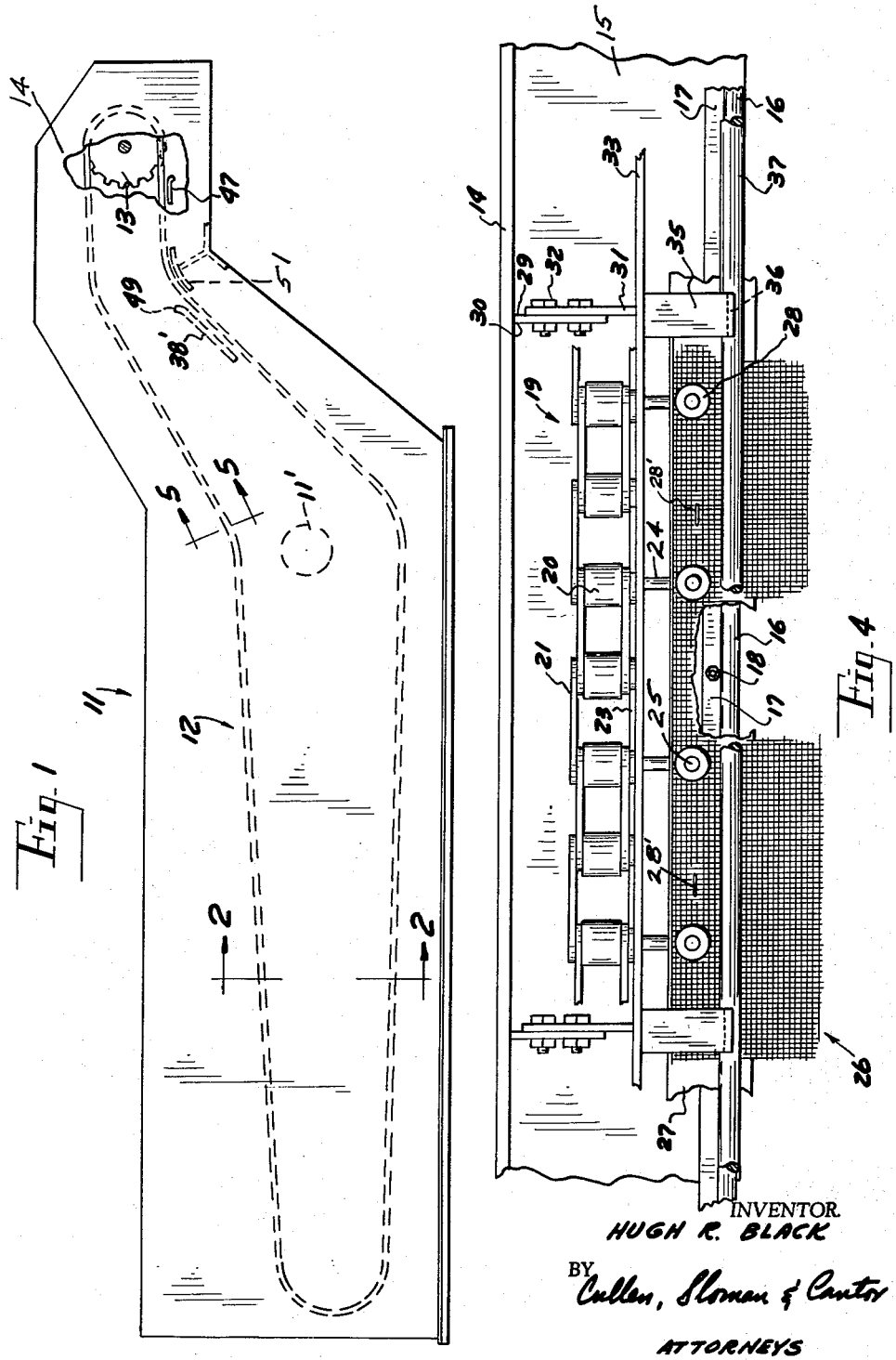
INVENTOR.
HUGH R. BLACK
BY 
ATTORNEYS

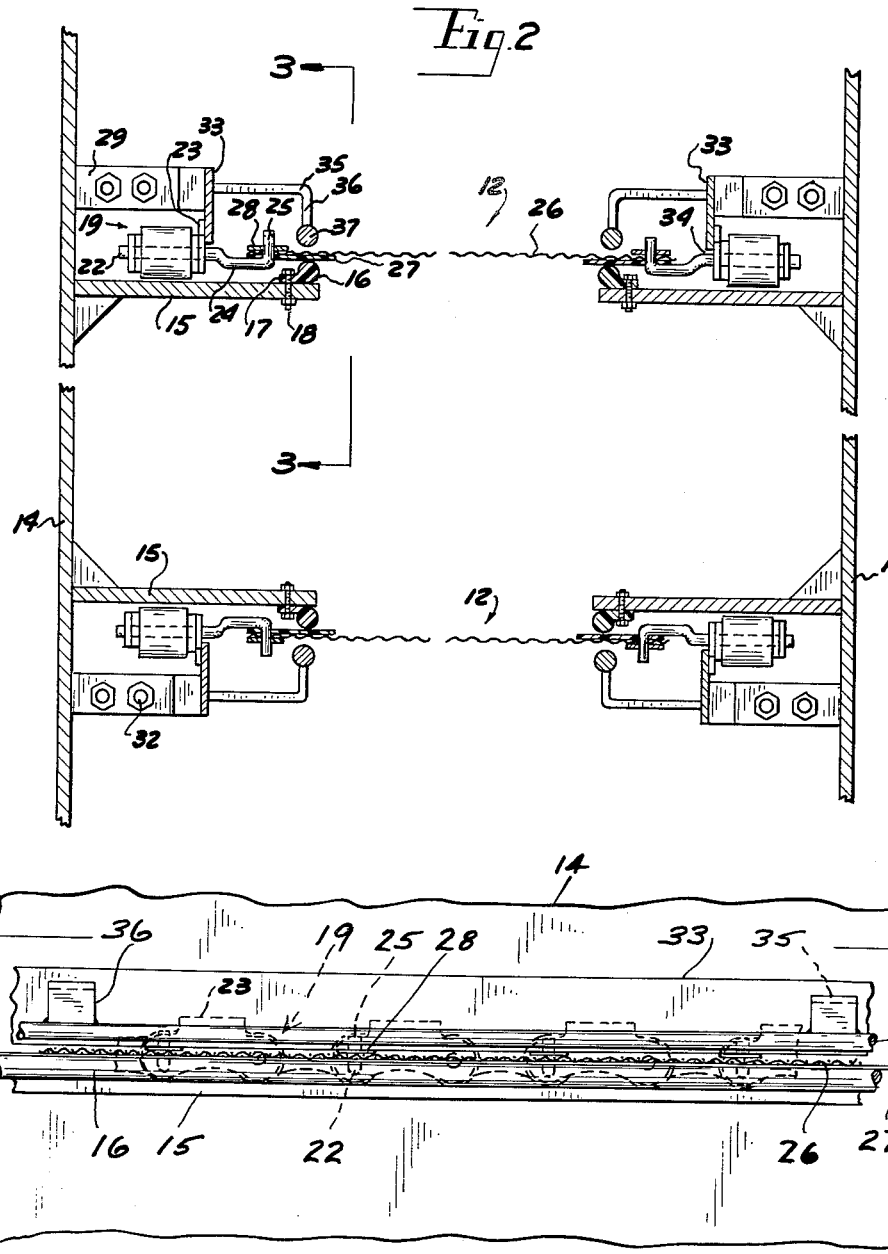

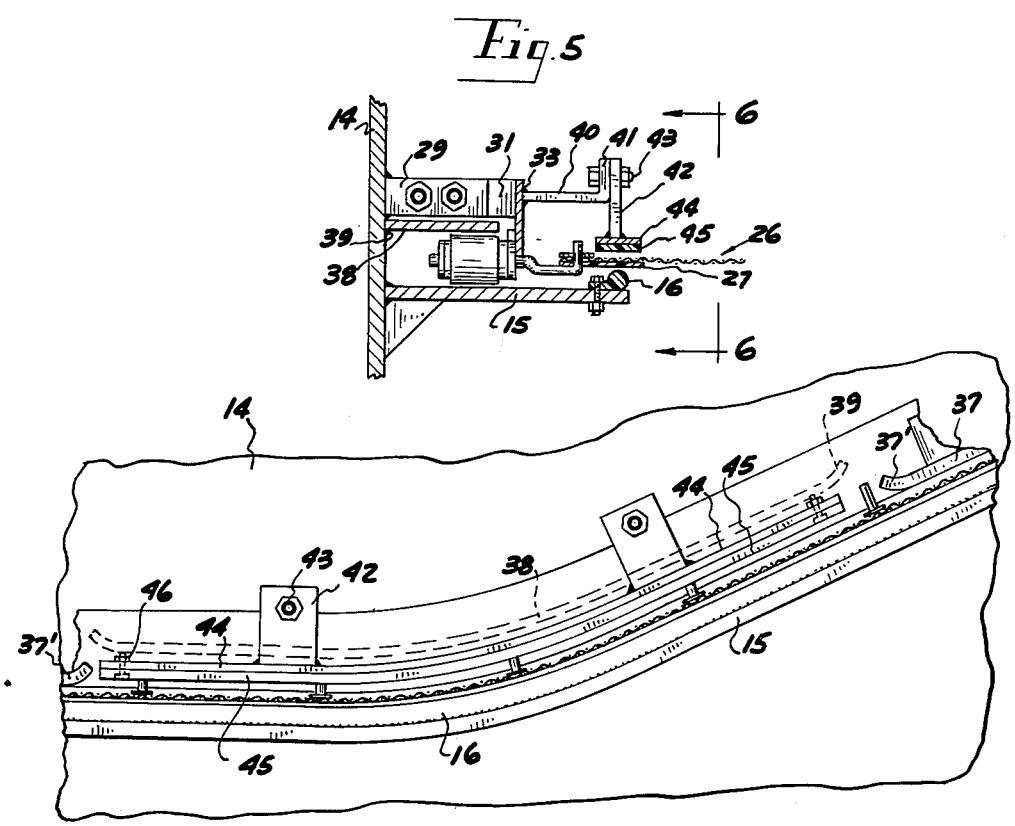
Fig. 5
Fig. 6
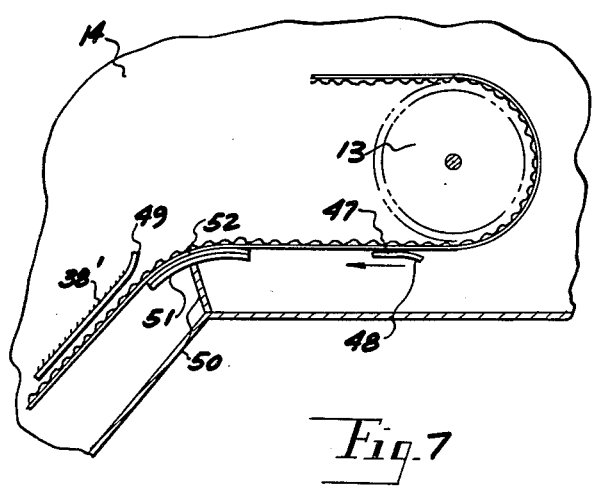
Fig. 7
INVENTOR.
HUGH R. BLACK
ATTORNEYS

United States Patent Office 3,197,030
Patented July 27, 1965

3,197,030
FILTER APPARATUS
Hugh R. Black, Birmingham, Mich., assignor to H. R. Black Company, Detroit, Mich., a co-partnership of Michigan
Filed Dec. 27, 1962, Ser. No. 247,685
2 Claims. (Cl. 210—400)

This invention relates to an automatic filter for removing impurities from liquids. The present application represents certain improvements in the Automatic Filter Screen disclosed in my presently copending application, Serial No. 166,521 filed January 16, 1962.

It is an object of the present invention to provide an improved structure and means for guidably and movably mounting the filter screen in the form of a continuous loop.

It is another object to provide in conjunction with the mounting flanges for the pairs of sprocket chains, elongated sealing bars, preferably constructed out of plastic material, adapted to supportably receive opposing marginal edges of the continuous loop of filter screen stretched between a pair of said chains, and wherein upon the undersurface of the filter screen there is provided at the outer edges thereof elongated strips of plastic material for cooperative sealing engagement therewith.

It is another object of the present invention to provide in conjunction with the filter screen along its adjacent outer edges elongated strips of protective plastic material anchored to the screen for minimizing frictional contact and for minimizing wear of the screen with respect to said sealing bars.

It is another object of the present invention to incorporate holddown means for retaining the screen with respect to said sealing bars.

It is another object of the present invention to provide at some of the turns of the guide flanges for the sprocket chains holddown plates cooperatively and retainingly engaging the sprocket chains for maintaining the same upon and adjacent the guide flanges.

It is another object to provide in conjunction with certain changes in direction of the said guide flanges, of supporting guide shoes mounting a plastic lining for cooperative retaining engagement with the surface of the screen and for guiding the same.

These and other objects will be seen from the following specification and claims in conjunction with the appended drawings in which:

FIG. 1 is a fragmentary elevational view of the present automatic filter with the guide flange, filter screen and chain assembly shown in dotted lines, but partly broken away to illustrate power-drive means for the sprocket chains.

FIG. 2 is a fragmentary section on an increased scale takne on line 2—2 of FIG. 1.

FIG. 3 is a fragmentary section taken on line 3—3 of FIG. 2.

FIG. 4 is a fragmentary section on an increased scale taken on line 4—4 of FIG. 3.

FIG. 5 is a fragmentary section taken on line 5—5 of FIG. 1 on an increased scale.

FIG. 6 is a fragmentary elevational view taken on line 6—6 of FIG. 5.

FIG. 7 is a fragmentary section corresponding to the end portion of the filter assembly shown in FIG. 1, and on an increased scale.

It will be understood that the above drawings illustrate merely a preferred embodiment of the invention, and that other embodiments are contemplated within the scope of the claims hereafter set forth.

Referring to the drawings, the present automatic filter includes a housing generally indicated at 11 and which is normally adapted to be either immersed in a tank containing impurities in fluid to be filtered or which itself contains fluids to be filtered and which has an outlet 11' by which fluid within the said housing may be withdrawn or pumped from the interior of the continuous filter belt or screen generally indicated at 12, FIGS. 1 and 2. A suitable power driven means is provided, such as a pair of sprocket wheels 13 adjacent one end of the housing and upon interior sides of walls 14 in driving engagement with the respective sprocket chains 19 hereafter described.

Referring to FIG. 2 the housing includes a pair of upright side walls 14 and upon the interior thereof there are provided the continuous guide flanges 15 which have a shape generally conforming to the shape of the filter screen 12 shown in FIG. 1. These flanges are mounted on and project inwardly from the respective side walls 14 and are suitably secured thereto as by welding to thus define upon the walls 14 of the said housing a pair of opposed guides of loop form.

A substantially continuous sealing bar of plastic material and generally circular in cross-section is indicated at 16 including mounting flange 17. Said bar is mounted over outer edge portions of guide flanges 15 and secured thereto by fasteners 18.

The sprocket chains which are guidably and movably mounted over and around looped flanges 15 are generally indicated at 19 in FIG. 4 and include a series of rollers 20 with interconnecting links 21 and conventional pins. Some of these pins take the form of pin 22 shown in FIG. 2. A series of additional links 23 with upright projections, FIG. 3, also form a portion of the sprocket chains.

Pins 22 extend transversely inward and have vertically displaced horizontal portions 24 which terminate in the outturned radial supports 25 providing a means of stretching and supporting filter screen 26 which extends between the opposed pairs of guide flanges 15 as best shown in FIG. 2.

In order to minimize wear of the preferably metallic or plastic or nylon screen 26 there are provided adjacent opposite longitudinal edges of said screen the protective plastic strips 27 of nylon or other plastic material secured to the undersurface of the said filter screen as by staples 28' or other type of fastener, FIG. 4.

A series of longitudinally spaced grommets 28 are secured through marginal portions of filter screen 26 throughout its length. These grommets cooperatively fit over the radial pin supports 25 by which the filter screen is movably supported over and with respect to sealing bars 16 and with respect to guide flanges 15 which also guidably support and mount sprocket chains 19.

A series of longitudinally spaced support plates 29 project radially inward from the interior of side walls 14 of the housing and are fixedly secured thereto by welding as at points 30, FIG. 4. Plates 31 are adjustably secured by fasteners 32 to support plates 29, and mount upright guard rail 33. The latter is of continuous form throughout the length of each guide flange and extends in a vertical plane for loose but cooperative engagement with pins 22 for the purpose of maintaining the sprocket chain upon and against the adjacent flange 15.

Guard rails 33 perform an additional important function, i.e. retainingly engaged portions of links 23 forming a part of chain 19 in order to bias the said chains outwardly relative to the filter screen 26 and for maintaining the same taut at all times.

A series of plates 35 are spaced longitudinally along guard rail 33 and are fixedly secured thereto as by welding. Plates 35 include depending members 36 secured to filter screen holddown bar 37 which extends substantially along the outer surface portions of the screen for the purpose of maintaining said screen upon the radial pin supports 25 as the screen movably extends around guide flanges 15.

The above described sealing bar 16 and wear strips 27 are preferably constructed of nylon or other plastic material having the wear characteristics of nylon and are designed for the primary purpose of protecting the screen against unnecessary wear and at the same time maintaining a seal between edge portions of the screen and said guide flanges. This is for the primary purpose of assuring that all fluid within the housing upon the exterior of said screen must enter through the screen before it is withdrawn through outlet 11' shown in FIG. 1.

As best shown in FIG. 1, portions of the guide flanges 15 which receive the upper flight of said sprocket chains are curved upwardly in the direction of chain movement. Since the sprocket wheels 13 are adapted to rotate in a clockwise direction, the pulling forces of said sprocket wheels would have a tendency of elevating the sprocket chain 19 from guide flanges 15 as at the point indicated by section line 5—5 of FIG. 1.

Therefore, in order to hold-down said sprocket chain at this point there is provided upon and adjacent the interior surfaces of said walls 14 the upwardly curved chain hold-down plate 38, FIG. 5, fixedly secured to side wall 14 by welding as at 39. Said plate extends inwardly of said side wall and is spaced above and parallel to adjacent portions of guide flanges 15.

Adjacent this same point, indicated at line 5—5 of FIG. 1, and in order to assure that the minimum amount of frictional pressure is applied to filter screen 26, there is an interruption of the hold-down bar 37 which terminates in the upturned end portion 37' FIG. 6.

In the area upon the interior of the housing adjacent hold-down plate 38 there are provided mounting plates 40 which extend inwardly at right angles to guard rail 33 and are fixedly secured thereto. Inner portions of members 40 are upturned at 41 and are provided for supporting members 42 by fasteners 43. Members 42 carry the elongated curved shoe 44. This shoe is generally of the same shape as chain hold-down plate 38 and upon their undersurfaces have secured thereto the elongated plastic linings 45 which overlie outer edge portions of screen 26 to cooperatively and guidably engage said screen, maintaining the same assembled upon pin supports 25 and for minimizing wear thereof at such points. In FIG. 6 fasteners are shown at 46 for securing linings 45 to shoes 44.

Adjacent a bottom portion of the return or lower flight of sprocket chains, and as best shown in FIGS. 1 and 7, there are provided a pair of chain support plates 47 curved downwardly at their rear ends at 48. These plates are secured to and extend inwardly from the respective side walls 14 of the housing to cooperatively receive and support the chains as they move in the direction of the arrow shown in FIG. 7.

Also as shown in FIG. 7, due to the downward inclination of guide flanges 15 and the corresponding inclination of the filter screen, there is also provided upon the interior walls 14 of the said housing an additional pair of sprocket chain hold-down plates 38'. These are of a construction similar to that above described with respect to FIG. 5, and whose leading edge portions are upturned at 49 to cooperatively and guidably receive portions of the sprocket chains as they move thereunder.

At this change of direction as also shown in FIGS. 1 and 7, there would normally be increased wear upon the filter screen 26. For this purpose there is provided between side walls 14 support means 50 which mount a series of arcuate support shoes 51 over which are positioned straps or liners 52 of a plastic material such as nylon to cooperatively engage undersurface portions of the filter screen throughout its width. Said shoes are arranged parallel to each other in laterally spaced relation and extend in the direction of movement of the filter screen so as to support the filter screen across its undersurface at this change of direction.

Having described my invention, reference should now be had to the following claims:

I claim:

1. In an automatic filter for removing impurities from liquids, a filter housing including opposed upright side walls, oppositely arranged continuous guide flanges mounted on and projecting inwardly from each side wall defining opposed looped guides, a power driven means within said housing, a continuous sprocket chain movably mounted on and around each flange and said drive means, a continuous sealing bar of plastic material on and projecting radially outward from the inner edge of each flange throughout its length, a continuous filter screen in the form of a loop corresponding to said guides with its edges overlapping said flanges respectively and removably mounted on and connected to corresponding portions of said chains for movement therewith, continuous plastic sealing and wear strips secured upon the undersurface of said screen adjacent and along its edges throughout its length cooperatively engaging said sealing bars respectively; each chain including a series of aligned pivotally interconnected segments, some of said pivotal connections including pins extending laterally inward of said chain, an elongated upright guard rail spaced inwardly from and parallel to and mounted on each side wall including a continuous bottom edge radially spaced from a flange respectively, said pins retainingly and slidably engaged by said guard rail for holding said chains respectively on said flanges, said pins having outturned ends mounting said screen, and an elongated hold-down bar spaced inwardly from and parallel to and mounted on said guard rail above said screen loosely engaging and retaining the screen upon said sealing bar.

2. In an automatic filter for removing impurities from liquids, a filter housing including opposed upright side walls, oppositely arranged continuous guide flanges mounted on and projecting inwardly from each side wall defining opposed looped guides, a power driven means within said housing, a continuous sprocket chain movably mounted on and around each flange and said drive means, a continuous sealing bar of plastic material on and projecting radially outward from the inner edge of each flange throughout its length, a continuous filter screen in the form of a loop corresponding to said guides with its edges overlapping said flanges respectively and removably mounted on and connected to corresponding portions of said chains for movement therewith, continuous plastic sealing and wear strips secured upon the undersurface of said screen adjacent and along its edges throughout its length cooperatively engaging said sealing bars respectively; portions of said guide flanges receiving the upper flight of said chains being curved upwardly in the direction of chain movement, an elongated similarly curved chain hold-down plate secured to each wall extending inwardly thereof and spaced above and guidably engaging said chains respectively; an elongated guard rail spaced inwardly from and parallel to and mounted on each side wall, longitudinally spaced inwardly directed mounting plates secured to each guard rail inwardly of said chain hold-down plate, an elongated similarly curved screen hold-down shoe adjustably secured to said mounting plates above edge portions of said screen, and an elongated plastic lining secured to the undersurface of said shoe cooperatively engaging said screen and retaining the screen upon said sealing bars.

References Cited by the Examiner

UNITED STATES PATENTS

| | | | |
|---|---|---|---|
| 729,805 | 6/03 | Stoveken | 198—194 X |
| 2,554,589 | 5/51 | Patz et al. | |
| 2,619,232 | 11/52 | Parsons et al. | 210—400 X |
| 2,885,080 | 5/59 | Goldman | 210—160 |
| 2,969,148 | 1/61 | Hirs | 210—108 |
| 3,093,578 | 6/63 | Hofmeister | 210—160 X |

REUBEN FRIEDMAN, *Primary Examiner.*

HARRY B. THORNTON, *Examiner.*